(12) United States Patent
Stetten

(10) Patent No.: US 7,841,916 B2
(45) Date of Patent: Nov. 30, 2010

(54) SOLAR POWERED INERTIAL FLUID MOBILIZER

(76) Inventor: George DeWitt Stetten, 105 Nantucket Dr., Pittsburgh, PA (US) 15238

( * ) Notice: Subject to any disclaimer, the term of this patent is extended or adjusted under 35 U.S.C. 154(b) by 205 days.

(21) Appl. No.: 12/210,209

(22) Filed: Sep. 14, 2008

(65) Prior Publication Data

US 2009/0075538 A1    Mar. 19, 2009

Related U.S. Application Data

(60) Provisional application No. 60/971,926, filed on Sep. 13, 2007.

(51) Int. Cl.
*B63B 22/00* (2006.01)
(52) U.S. Cl. .......................................... 441/1; 210/620
(58) Field of Classification Search ............. 440/1; 210/242.2, 620; 441/1

See application file for complete search history.

(56) References Cited

U.S. PATENT DOCUMENTS

| | | | | |
|---|---|---|---|---|
| 6,083,405 | A * | 7/2000 | Tanaka et al. | 210/739 |
| 6,676,837 | B2 * | 1/2004 | Keeton, Jr. | 210/620 |
| 7,329,351 | B2 * | 2/2008 | Roberts et al. | 210/620 |
| 2003/0085059 | A1 * | 5/2003 | Kuckes et al. | 175/45 |

* cited by examiner

*Primary Examiner*—Stephen Avila

(57) ABSTRACT

One embodiment of a fluid mobilizing vessel shown in FIG. 1 comprises a hull (14) impervious to a surrounding fluid (12), a solar cell (16) capable of converting light (18) into electrical energy, an electromechanical actuator (24), and a mobile weight (28) movable with respect to the hull, whereby the electromechanical actuator moves the weight relative to the hull, causing compensatory motion of the hull within the surrounding fluid and thereby motion (32) of the surrounding fluid.

13 Claims, 2 Drawing Sheets

SOLAR POWERED INERTIAL FLUID MOBILIZER

CROSS-REFERENCE TO RELATED APPLICATIONS

This applications claims the benefit of provisional patent application Ser. No. 60/971,926, filed 2007 Sep. 13 by the present inventor.

FEDERALLY SPONSORED RESEARCH

Not Applicable

SEQUENCE LISTING OR PROGRAM

Not Applicable

BACKGROUND

1. Field

This application relates to devices that create motion in fluids.

2. Prior Art

A need exists for the improvement of water bodies in aquaculture systems, reservoirs, fish tanks, artificial ponds and lakes, swimming pools, bays and inlets, and the like, in controlling algae growth, mosquito propagation, ice formation, distributing nutrients, breaking up oil slicks, and other problems generally related to stagnation and/or lack of aeration of the water. Solutions exist that use photovoltaic solar cells as a power source, which are especially useful for remote locations or where it is important to avoid the cost or hazards of electricity from power lines.

"Solar aeration system," U.S. Pat. No. 6,676,837, uses an air compressor powered by solar cells and batteries to aerate water. Similarly, solar-powered fountains, such as the "Solar Fountain Pump" produced by Solars-China.com, are commercially available. In some cases, solar powered water pumps powered by the sun are used to re-circulate water to an artificial waterfall in a pond where there is no natural inflow from a stream. However, these solutions suffer from problems with clogging and tangling by algae, seaweed, and other solid matter floating in the water, because their propellers, impellers, or other articulated effectors are in direct contact with the water.

My fluid mobilizer addresses these problems by creating water motion using a floating vessel inside of which an inertial system causes the entire vessel to move in the water. Such a vessel may remain un-entangled in a pond because of its single, unarticulated exterior surface, especially if the shape of the vessel's hull is relatively smooth. The overall motion of the vessel may also create a clear space by pushing material floating on the surface away from the vessel.

SUMMARY

In accordance with one embodiment, a fluid mobilizing vessel comprises a hull impervious to a surrounding fluid, a solar cell capable of converting light into electrical energy, an electromechanical actuator, and a mobile weight movable with respect to the hull, whereby the electromechanical actuator moves the weight relative to the hull, causing compensatory motion of the hull within the surrounding fluid and thereby motion of the surrounding fluid.

DRAWINGS

Figures

Reference Numerals

| | |
|---|---|
| 10 buoyant vessel | 12 surrounding water |
| 14 transparent waterproof hull | 16 solar cell |
| 18 light ray from the sun | 20 the Sun |
| 22 wires | 24 electric motor |
| 26 motor shaft | 28 eccentric weight |
| 30 lever | 32 waves generated in water |
| 34 ring for attaching tether | 36 wires |
| 38 interface | 40 wires |
| 42 solenoid coil | 44 solenoid plunger |
| 46 weight | 48 spring |
| 50 weight | 52 rigid brace |
| 54 spring | 56 permanent magnet |

DETAILED DESCRIPTION

Figure 1:
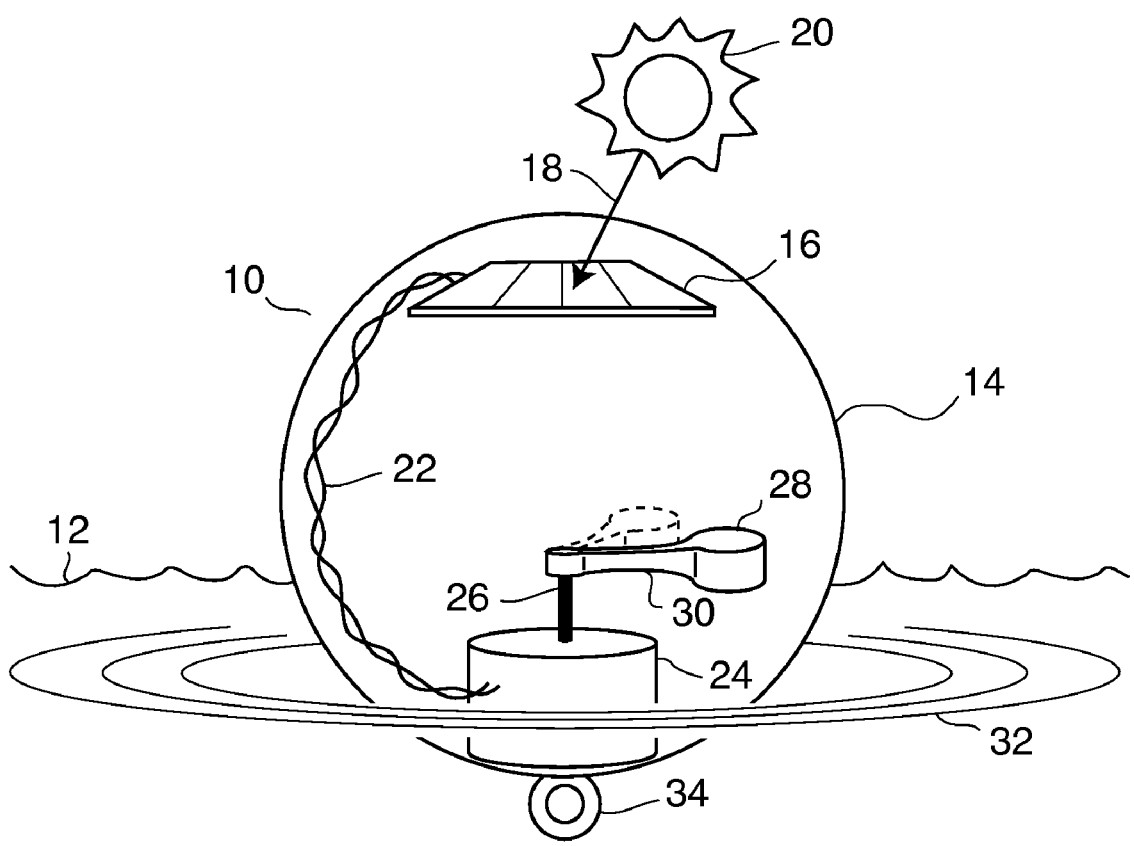
FIG. 1 shows an embodiment based on a motor that moves an eccentric weight in a circular path to generate inertial motion of the vessel.

One preferred embodiment of the Solar Powered Inertial Fluid Mobilizer is illustrated in FIG. 1. The embodiment comprises a buoyant vessel 10 floating in a body of surrounding water 12. The buoyant vessel has a spherical hull 14 that is waterproof and transparent. Hull 14 contains solar cell 16 that converts light 18 from the Sun 20 to an electrical current in wires 22 powering electrical motor 24, which is rigidly attached to hull 14, to turn shaft 26, causing eccentric mobile weight 28 attached by lever 30 to rotate around the axis of shaft 26 (movement of the weight is shown with dashed lines). The force employed in moving the weight creates an equal and opposite force that causes hull 14 to move in the water 12 creating waves 32 in the water. A ring 34 is attached to the bottom of hull 14 to provide a means to tether the vessel to prevent it from drifting. The device may be hermetically sealed to extend its functional lifetime.

The embodiment in FIG. 1 uses light energy from the sun to move the weight 28 in a circular motion, which causes the vessel to move, creating wave motion 32 in the surrounding fluid 12 without entanglement or clogging of the apparatus, and without requiring connections to an external power-line. The embodiment is therefore inexpensive to operate, safe, and requires little or no maintenance.

Various other adaptations and implementations of the basic concept are possible. For example, rather than creating rotational motion, it may be advantageous to create vertical periodic motion of the vessel, causing the vessel to bob up and down in the water. The embodiment shown in FIG. 2 comprises a buoyant vessel 10 floating in a body of surrounding water 12. The buoyant vessel has a spherical hull 14 that is waterproof and transparent. Hull 14 contains solar cell 16 that converts light 18 from the Sun 20 to an electrical current in wires 36 connected to interface 38 (described in detail below), with interface 38 also connected by wires 40 to electromagnetic solenoid 42 rigidly attached to hull 14. The plunger 44 of solenoid 42 comprising a ferromagnetic material is attached to a mobile weight 46 suspending on springs 48 such that periodic vertical motion of weight 46 may result when interface 38 generates an appropriate time-varying current in solenoid 42. Periodic vertical motion (shown with dashed lines) of weight 46 causes vertical motion of hull 14 in water 12 creating waves 32 in without entanglement or clogging of the apparatus.

Interface 38 may contain a number of components involved in producing a time-varying current in solenoid 42 appropriate for creating periodic vertical motion of weight 46.

Interface 38 may preferably contain a control system (which may include analog circuitry, digital circuitry, a computer, or some combination thereof) to control the time-varying current in the solenoid. The direction and magnitude of the time-varying current may be controlled so as to build up harmonic motion of hull 14 and of surrounding fluid 12. Interface 38 may include inertial sensors to measure the motion of hull 14, and interface 38 may also include sensors to measure location, motion, or both, of actively moved weight 46 and of passive weight 50 (described below). Interface 38 may employ feedback from these sensors to optimize the time-varying current in the solenoid to maximize the periodic motion of the vessel.

Interface 38 may include an onboard navigation system to determine the location of the vessel, such as a Global Positioning System (GPS) or other navigation system based on optical tracking, ultrasound, or computer vision. These are well known to those skilled in the art. Interface 38 may include a communications system to provide a means of transferring information to and from a remote system, such as another vessel or a central control station. Such a communications system may use radio, infrared, or other channels well known to those skilled in the art.

For some applications, such as preventing the buildup of ice on a body of water, interface 38 may contain batteries or other energy storage devices to continue operation during the night, as well as timing and sensing circuitry to conserve battery power by operating intermittently when sunlight is not present.

Figure 2:
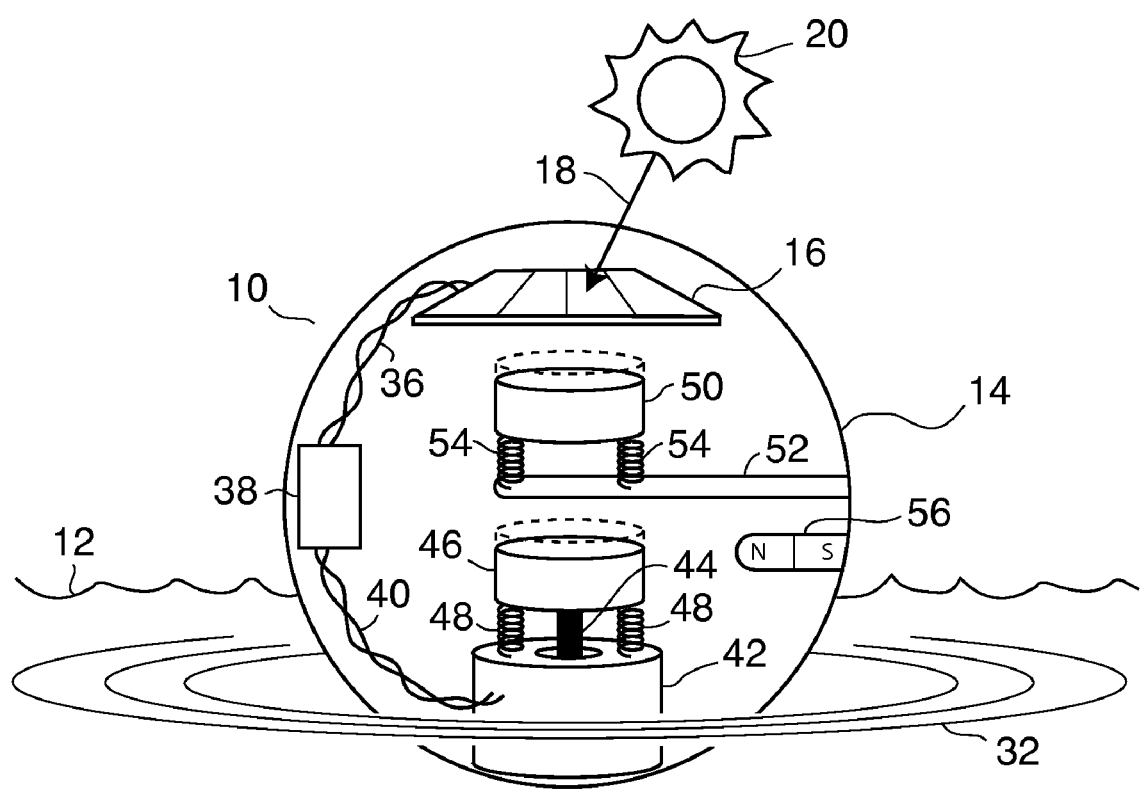
FIG. 2 shows an embodiment based on a solenoid that moves a weight periodically in a vertical path to generate inertial motion of the vessel.

Several additional components are shown in the embodiment in FIG. 2:

Energy may not be stored in the periodic vertical motion of weight 46, in FIG. 2, as efficiently as in the circular motion of eccentric weight 28, in FIG. 1. To remedy this, the embodiment in FIG. 2 includes an additional passive weight 50 suspended by springs 54 from rigid brace 52 attached to hull 14. Vertical periodic motion (shown with dashed lines) induced in weight 50 by motion of hull 14 may increase the ability of vessel 10 to store mechanical energy, and thereby increase the magnitude of the resulting periodic motion of hull 14 and of waves 32 produced in the surrounding water 12. Additional energy may be stored in the waves 32 themselves. Interface 38 may use measurements of the vessel motion from its motion sensors in determining the time-varying current in solenoid 42. Use of such regenerative feedback to create of harmonic motion is well known to those skilled in the art.

Finally, the embodiment in FIG. 2 includes a permanent magnet 56 with its north "N" and south "S" poles oriented so as to cause the vessel to turn in the Earth's magnetic field to a preferred orientation, much as a compass needle turns to a preferred orientation in a magnetic compass. The purpose of this may be to maximize exposure of the solar cell 16 to sunlight at latitudes away from the equator, or to optimize the response of a radio antenna in a communications system included in interface 38.

Other embodiments are possible. The shape of the fluid-mobilizing vessel may be designed so as to facilitate the vessel's periodic motion in the water by minimizing drag. Alternatively, the vessel may be shaped in such a way as to produce a net non-periodic motion across the water surface, along a straight or a curved path, by employing asymmetry in the vessel's shape. This may permit the vessel to bring its beneficial effect to a larger area of the water surface over time. Various curved or flat regions in the vessel's exterior at specific heights relative to its resting position in the water may yield impact with the water to facilitate aeration. For example, a horizontal plane in the external surface of the hull may be made to repeatedly "slap" against the surface of the water by periodic vertical motion of the hull, thereby facilitating aeration of the water. The vessel's exterior surface shape may also be designed to maximize clearance of the surface algae by generating a net flow of surface water towards or away from the vessel.

Conclusion, Ramification, and Scope

Accordingly, the reader will see that the Solar Powered Inertial Fluid Mobilizer operates without tending to tangle or clog, because using a movable weight to create inertial motion of the hull prevents articulated moving parts from touching the surrounding fluid. The solar cell provides a safe, independent, and non-diminishing source of energy.

Although the description above contains many specificities, these should not be construed as limiting the scope of the embodiments but as merely providing illustrations of some of the presently preferred embodiments. For example, in FIG. 1, motor 24, shaft 26, lever 30, and mobile weight 28 may all be represented by a miniature cell phone vibrator; plunger 44 in solenoid 42 in FIG. 2 may be a permanent magnet rather than simply a ferromagnetic material, permitting electromechanical forces to be created between solenoid 42 and weight 46 in both upward and downward directions, depending on the direction of the current in the solenoid; an electromechanical actuator other than a motor or a solenoid may be employed, based, for example, on other configurations of permanent magnets, electromagnets, electrostatic drivers, electrochemical actuators, or other means of converting electrical energy into mechanical energy.

Although the surrounding fluid in embodiments thus far described has been water, nothing in the description should be construed to limit the mobilized fluid to water. The mobilizer may be used for other purposes, such as circulating warm pools of oil to cool them, or preventing the formation of a "skin" on the surface of a vat of liquid sewage.

Nothing in the description of the particular uses should limit the fluid mobilizer to those uses. For example, in growing algae for food or fuel, maximal rather than minimal algae growth may be the goal. Algae grown in large vats may benefit from fluid motion to circulate nutrients. Alternatively, colored water and oil may be stirred in a decorative jar by a miniature solar powered mobilizer, when placed in a sunlit window, strictly for aesthetic purposes.

Thus the scope of the embodiments should be determined by the appended claims and their legal equivalents, rather than by the examples given.

I claim:

1. A fluid mobilizing vessel comprising
   a hull impervious to a surrounding fluid
   a solar cell capable of converting light into electrical energy
   an electromechanical actuator
   a mobile weight not in contact with said surrounding fluid and whose center of mass is movable with respect to the hull whereby the electromechanical actuator moves the weight relative to the hull, causing compensatory motion of the hull within the surrounding fluid and thereby motion of said surrounding fluid.

2. The vessel of claim 1 wherein said electromechanical actuator is an electrical motor whose shaft is attached to an eccentric mobile weight via a lever arm, whereby rotation of the shaft moves the center of mass of said weight in a circular path.

3. The vessel of claim 1 wherein said electromechanical actuator is an electromagnetic solenoid whose plunger is attached to the mobile weight whereby activation of the solenoid results in linear motion of the center of mass of said mobile weight with respect to the hull.

4. The vessel of claim 1 wherein said vessel includes an external attachment point for tethering the vessel.

5. The vessel of claim 1 wherein said vessel is hermetically sealed.

6. The vessel of claim 1 wherein said vessel includes a control system to determine the electrical current to the actuator.

7. The vessel of claim 1 wherein said vessel includes motion sensors to measure motion of the hull in the water.

8. The vessel of claim 1 wherein said vessel includes a navigation system for determining the location of the vessel.

9. The vessel of claim 1 wherein said vessel includes a communication system for transferring information between said vessel and a remote system.

10. The vessel of claim 1 wherein said vessel includes a rechargeable electrical storage system whereby operation is possible when external light is not available.

11. The vessel of claim 1 wherein said vessel includes additional passive systems of weights whereby the vessel may have an increased ability to store energy in its periodic motion.

12. The vessel of claim 1 wherein said vessel includes sensors to determine location, motion, or both, of one or more mobile weights.

13. The vessel of claim 1 wherein said vessel includes a permanent magnet whereby a preferred orientation of the vessel may be maintained with respect to the Earth's magnetic field by forces generated directly between said permanent magnet and the Earth's magnetic field.

* * * * *